United States Patent

Anderson, Jr.

[11] 3,844,323
[45] Oct. 29, 1974

[54] SPLIT LOCK RING
[75] Inventor: Raymond Burr Anderson, Jr., Pasadena, Calif.
[73] Assignee: Ceromet, Inc., Industry, Calif.
[22] Filed: Oct. 1, 1973
[21] Appl. No.: 402,365

Related U.S. Application Data
[62] Division of Ser. No. 202,167, Nov. 26, 1971, Pat. No. 3,762,455.

[52] U.S. Cl. .................................... 151/28, 85/8.8
[51] Int. Cl. ......................................... F16b 39/10
[58] Field of Search ............. 151/28, 27, 29, 8, 30; 85/8.8, 8.6, 51, 62

[56] References Cited
UNITED STATES PATENTS

| 578,276 | 3/1897 | Strauss et al. | 151/28 |
| 1,352,643 | 9/1920 | Young | 151/28 |
| 1,440,938 | 1/1923 | Sieroslawski | 151/28 |
| 1,755,807 | 4/1930 | Boles | 151/28 |
| 2,426,219 | 8/1947 | Jackson | 151/28 X |
| 2,755,698 | 7/1956 | Wurzel | 85/8.8 |
| 2,813,732 | 11/1957 | Hird | 85/8.8 X |

FOREIGN PATENTS OR APPLICATIONS
540,229  12/1931  Germany ............................. 85/8.8

Primary Examiner—Ramon S. Britts
Attorney, Agent, or Firm—Jackson & Jones Law Corporation

[57]  ABSTRACT

A split lock ring is disclosed wherein the lock ring is adapted to be disposed and secured within an undercut cavity formed in the main body of a lock nut. The cavity is formed by a bottom transverse wall, a peripheral side wall extending upwardly therefrom, and an upper transverse wall. An annular set of teeth is mounted about the periphery of the lower portion of the sidewall adjacent the bottom wall. The space between the teeth and the upper transverse wall forms an undercut groove. The lock ring comprises a split ring having a central portion and a pair of leg portions extending outwardly therefrom. The central portion includes an inwardly extending key, an outwardly extending projection, and a pair of sectors having a plurality of teeth formed on the periphery thereof. The key is adapted to extend into a longitudinal keyway formed on an axle, shaft or like element to lock the ring against rotation with respect to the element. The projection is adapted to extend into the undercut groove while the teeth of the sectors are adapted to engage a portion of the teeth formed in the cavity to lock the ring against rotation with the nut. The central portion of the ring is secured in position by the legs of the lock ring extending into the undercut groove. Besides being biased outwardly to engage the sidewall of the undercut groove, the lock ring legs are biased in the axial direction to cause the upper surface of the legs to be biased against the upper wall and the central portion of the ring to be biased against the bottom surface of the cavity, thereby ensuring that the lock ring remains secure and in contact with the teeth in the cavity without becoming dislodged.

6 Claims, 3 Drawing Figures

PATENTED OCT 29 1974  3,844,323

SPLIT LOCK RING

RELATED APPLICATIONS

This application is a division of application Ser. No. 202,167, filed Nov. 26, 1971 for LOCK NUT which is now U.S. Pat. No. 3,762,455 granted on Oct. 2, 1973.

BACKGROUND OF THE INVENTION

1. Field of the Invention

The present invention relates to couplings and, more particularly, to split lock rings for use in lock nut assemblies for preventing reverse rotation and displacement of bolts.

2. Description of the Prior Art

Lock nuts have long been utilized for preventing antirotation of bolts. In a typical conventional construction, the bolt is provided with an axial groove or keyway, while the lock nut is equipped with an annular locking member having an inwardly extending key. The locking member is adapted to extend over the bolt shaft with the key extending into the bolt keyway. The locking member is also provided with means for fixedly engaging the lock nut to prevent the lock nut from turning on the bolt shaft.

Various means have been provided for accomplishing this engagement. U.S. Pat. No. 1,022,657 discloses an apertured locking member having a pair of internal lugs, which is adapted to travel along the grooves of the bolt, and a pair of external projections, which is adapted to pass through slots formed on the head of the lock nut. After the projections pass through the slots, the lock nut is rotated to cause the projections to move through transverse grooves until they are snapped into locking notches formed in the nut. A spring is located within a cavity formed in the nut to bias the projections against the notches. A shortcoming with such a device is that the limited number of locking notches limits the angular movement of the lock nut to large intervals. This creates too large of an axial displacement for each interval and is not acceptable for present day requirements. Moreover, the extra spring construction and the special tools required, both add greatly to the complexity of the apparatus.

U.S. Pat. No. 925,067 discloses an apertured locking ring comprising a head having an inwardly projecting key and an aperture which is adapted to extend over and receive any one of a plurality of studs peripherally spaced on the head of the lock nut. Although the multiplicity of stud locations enables the apparatus to have a higher degree of adjustment, the shortcoming lies in the fact that the lock ring is mounted directly on top of the lock nut with no means for securing it against axial movement. As a result, the lock ring can easily become dislodged.

U.S. Pat. No. 1,197,429 discloses a lock nut assembly in which the locking ring is secured to the lock nut by means of a cap which is threadedly mounted on exterior threads formed on the lock nut. Besides having added complexity, another shortcoming with the apparatus is that no means are provided to lock the cap against rotation. As a result, the cap could easily become loosened by bolt vibrations, and the lock ring could become dislodged.

U.S. Pat. No. 1,352,643 discloses a split ring having tooth shaped projections adapted to engage any portion of internally extending teeth extending about the periphery of a cavity formed in the lock nut. The ring also has a pair of outwardly extending flanges formed on the legs thereof which is adapted to extend beneath the teeth in an undercut annular groove to positively prevent displacement of the split locking ring when in the applied position. A shortcoming with this device is that the flanges did not adequately support the ring to prevent it from wobbling within the groove. This movement can cause wear on the lock ring and the teeth located on the lock nut.

The upper sides of the flanges are beveled to bear against the mating bottom surfaces of the teeth. Although this structure attempts to secure the flanges from axial movement, the teeth engaging the flanges are subject to undue friction and wear. This is because the only forces that the teeth are designed to withstand are the torsional forces involved. Any axial forces acting thereon tend to wear the teeth unduly.

SUMMARY OF THE INVENTION

The present invention obviates the above-mentioned shortcomings by providing a two piece lock nut assembly in which the lock ring is easily and securely mounted on the nut. The assembly comprises a nut having an undercut annular recess circumscribing the bore of the nut. The recess is formed with a plurality of teeth circumferentially positioned on the lower portion thereof, with the upper portion thereof forming an undercut groove. A split lock ring is adapted to be positioned within the nut recess, the ring having a plurality of teeth for engaging the teeth within the recess to prevent the ring from rotating with respect to the nut. The lock ring also includes an inwardly extending key for extending into a keyway formed on a bolt, axle or like element to lock the ring with respect to the element. The leg portions of the lock ring are adapted to extend into the undercut groove to radially bias the legs therewithin. The leg portions are also resiliently bent in the axial direction to axially bias the ring against the sidewalls of the recess. This enables the ring to fit securely within the recess or undercut and prevent the ring from becoming dislodged. The primary advantage of this structure is that the axial force of the ring acting on the recess is applied to the side walls thereof and not against the teeth of the recess. As a result, the only forces acting on the teeth are the contemplated torsional forces.

The lock ring also includes an outwardly extending projection located on the central portion thereof to provide the ring with a three area support, each support retaining sector being spaced approximately 120° apart. This support structure also prevents the lock ring from being discharged from the recess.

Another important advantage of the present invention is that the key is positioned in the same radius as the projection. This enables the key to function as a cam by engaging the bolt keyway as the lock ring is pivoted into position to force the projection positively into the groove.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

DESCRIPTION OF THE PREFERRED EMBODIMENT

Figure 1:
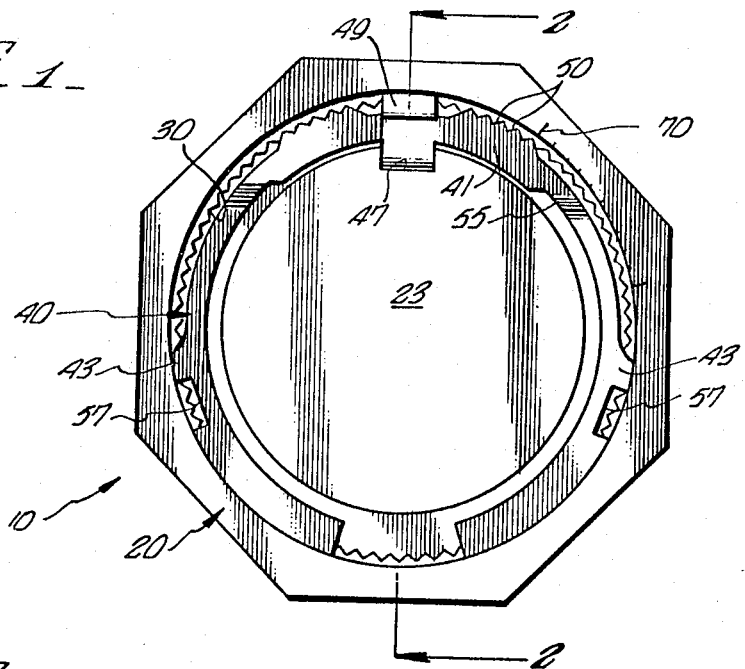
FIG. 1 is an elevational view of the lock nut of the present invention.
Figure 2:
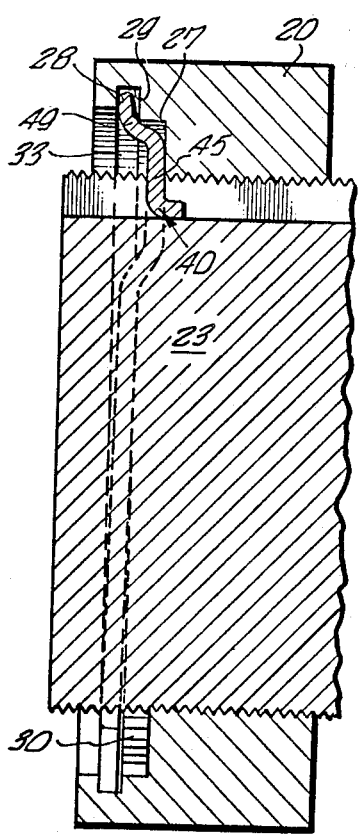
FIG. 2 is a sectional view of the lock nut taken along lines 2—2 of FIG. 1.
Figure 3:
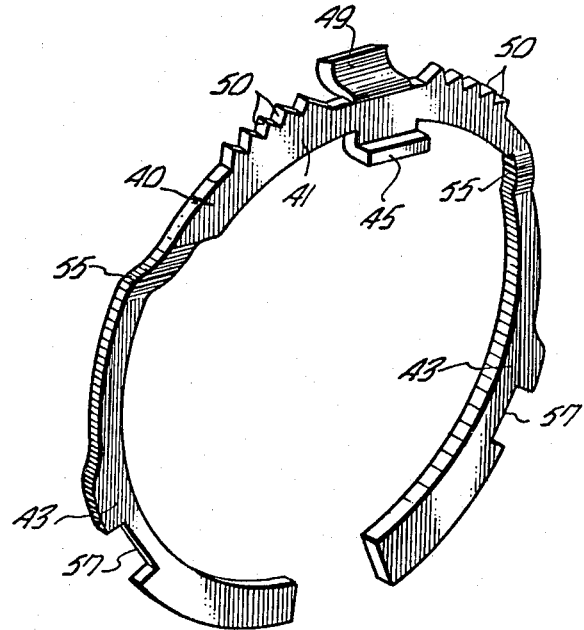
FIG. 3 is a perspective view of the split ring.

Referring now to the drawings, FIGS. 1 – 3 illustrate a lock nut assembly, generally indicated by arrow 10, comprising a nut 20 and a split lock ring 40.

The nut 20 comprises an annular bore which is threaded for engagement with a threaded axle or shaft (hereinafter referred to as element 23) 23. The upper portion of the nut also includes an undercut annular recess circumscribing the bore 21. The recess is formed by a lower transverse wall 27, an upper transverse wall 28, and a peripheral wall 29. The recess is further formed by a plurality of circumferentially spaced teeth 30 formed on the lower portion of the peripheral wall 29 adjacent the lower transverse wall 27. The space between the teeth 30 and the upper transverse wall 28 forms an undercut groove 33. The top surface of the nut 20 has a plurality of indicating lines 70 etched about the periphery of the recess.

The lock ring 40 comprises a thickened central portion 41 and a pair of semicircular leg portions 43 extending outwardly therefrom. The central portion 41 comprises a key 45 which is adapted to extend into a keyway 47 longitudinally formed in the element 23. Radially opposite of the key 45 is an outwardly extending projection member 49 surrounded by a pair of arcuate sections having a plurality of teeth 50 formed thereon. The semicircular leg portions 43 extend in the same plane as the projection member 49 while the ring body or central portion 41 extends in a lower parallel plane. The lock ring 46 is made of a resilient material such as spring steel to enable the leg portions to be radially biased upon compression. Each of the leg portions also is bent in the axial direction at 55 to enable the leg portion to be resilient in the axial direction also. Finally, each of the leg portions further includes a notch 57 formed thereon for receiving a tool for removal purposes.

OPERATION

In applying the lock nut assembly 10 onto an element 23 or other like structure such as axles, the nut 20 is threaded onto the bolt 23 until it bottoms out or torques against a workpiece (not shown). If desired, the nut is then backed off from the workpiece a predetermined amount. The lock ring 40 is then taken and positioned over the free end of the bolt 23 with the key 45 being aligned with the keyway 47 of the bolt 23. In this aligned position, the outwardly extending projection 49 is inserted into the annular groove 33. The leg portions 43 are then radially compressed, usually by hand to permit them to enter into the groove 33. As this occurs, the key 45 is dimensioned to engage the bottom of the keyway 47 to act as a cam to force the outwardly extending projection 49 into the groove 33 and drive the teeth 50 of the central portion 41 into engagement with the teeth 30 located within the recess of the nut 20. After the leg portions 43 have been moved into the plane of the groove 33, the leg portions 43 expand radially outwardly to enable them to engage the peripheral wall 29 of the nut recess. This radial force holds the teeth 50 of the lock ring 40 in engagement with the teeth 30 of the nut 20 to prevent relative rotation therebetween. Moreover, in this locked position, the engagement of the key 45 with the keyway 47 prevents the ring 40 from rotating relative to the bolt 23.

In order to ensure against the central portion 41 of the split ring 40 from wobbling with respect to the nut 20, the leg portions 43 are biased in the axial direction also by having them resiliently bent at 55. This axial force biases the central portion 41 of the lock ring 40 against the lower transverse wall 27 and the extremities of the leg portions 43 against the upper transverse wall 28. This enables the split ring to remain in a snug engagement within the recess without having any axial forces acting on the teeth 30. The only forces acting on the teeth are the torsional forces, of which they have been designed to withstand.

Upon removal, a hand tool such as a screw driver is inserted into either one of the notches 55 of each of the leg portions 49 to wedge them inwardly to enable them to become disengaged with the recess.

As can be seen, a two piece lock nut assembly is provided which can be installed and removed easily and can function in a secure manner.

The upper face of the nut 20 also includes a plurality of indicator notches 70 spaced about the periphery of the nut. These notches are provided to indicate fine adjustments of the nut. The notches are calibrated to indicate the amount of axial travel of the nut. For example, after a wheel bearing has been worn, the nut 20 will travel further onto the axle when it is adjusted. The resultant change in the setting will indicate how much the nut has traveled.

It should be noted that various modifications can be made to the apparatus while still remaining within the purview of the following claims.

What is claimed is:

1. A split ring adapted for use in a lock nut assembly to be secured to a threaded member with a keyway, wherein the assembly includes a nut having an axial bore and an annular shoulder portion surrounding the bore at one end of the nut, the nut further having an axially traverse annular groove circumscribing the base of the nut adjacent the shoulder portion and being axially outward thereof toward the one end, the nut further including alignment means for relatively positioning a second piece, the split ring comprising a radially inwardly extending key member on the inner edge thereof adapted to engage the keyway groove of the threaded element, a ring body portion and a flexible leg portion extending circumferentially from each end of the body portion, the ring body portion lying in a first plane and the flexible leg portions being offset from the body portion and substantially lying in a second plane substantially parallel to the first plane, the pair of flexible leg portions capable of operatively engaging the annular groove and the ring body portion capable of operatively bearing against the shoulder portion;

co-acting alignment means on the split ring capable of co-operating with the nut alignment means to prevent relative rotation between the nut and the split ring, and camming means for biasing the split ring against the nut including an outwardly projecting member on the outer edge of the split ring body portion extending into the second plane of the flexible leg portions with at least a portion of the projection member lying in the second plane capable of engaging the annular groove of the nut whereby the respective operative engagement of the projecting member, ring body member and flexible leg portions with the nut in two separate planes can provide an axial force between the nut and split ring to hold them together.

2. The invention of claim 1 wherein the split ring body portion comprises a thickened central portion.

3. The invention of claim 1 wherein said projection member is mounted on the same radius as the key member.

4. The invention of claim 1 wherein said alignment means on the ring for engaging the alignment means of the nut comprises an arcuate sector formed on the body portion having a plurality of teeth formed on the peripheral edge thereof for engaging alignment means on the shoulder portion.

5. The invention of claim 2 wherein the key is formed on the central portion of said ring.

6. The invention of claim 1 wherein at least one of the flexible leg portions includes a notch adapted to receive a tool to enable the flexible leg portion to be compressed for removal of the split ring from the nut.

* * * * *